Patented Mar. 26, 1940

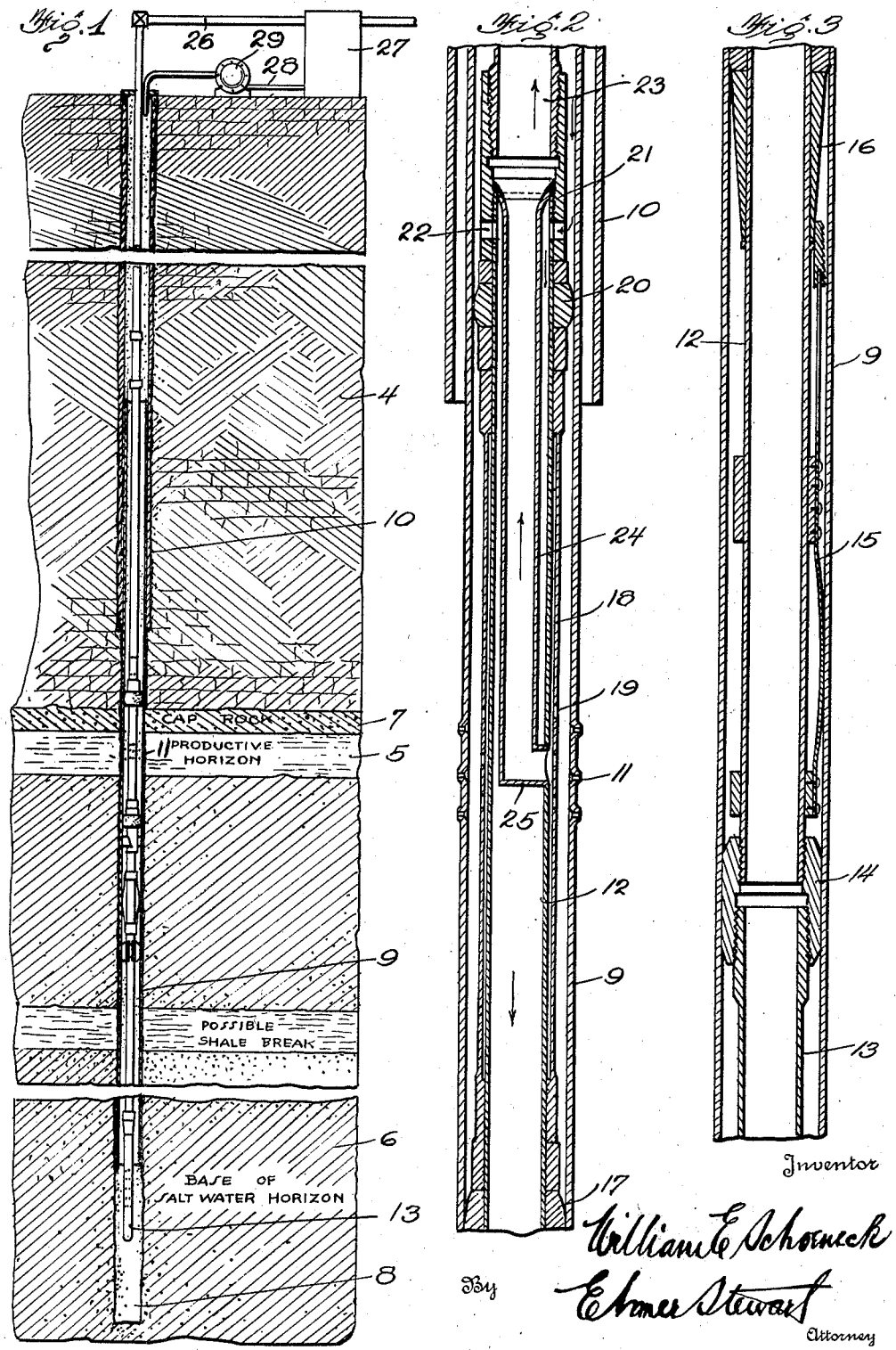

2,194,616

UNITED STATES PATENT OFFICE 2,194,616

MEANS FOR OPERATING OIL WELLS

William E. Schoeneck, Shreveport, La., assignor to The Ohio Oil Company, Findlay, Ohio, a corporation of Ohio Application November 17, 1937, Serial No. 175,126

4 Claims. (Cl. 166—1)

This invention relates to operating wells in a producing oil field especially where the oil body or deposit is such that the withdrawal of oil is accompanied by a considerable quantity of brine or salt water. There are many oil fields in which the petroleum can be obtained only accompanied by considerable quantities of salt water found to exist in and about the oil body.

While there is an obvious disadvantage in the presence of the salt water in the oil as recovered due to the difficulty of separation yet there are many other reasons which interfere with successful and economical operation of such wells. Chief of these objections, is that the hydrostatic pressure upon an oil body is diminished by the removal of liquid. When the quantity of liquid is in excess of the oil actually recovered, there is a resulting excess in loss of pressure. In other words the quantity of salt water removed from the well necessarily causes an additional loss of oil pressure. This results in hastening the time when the oil will no longer flow from its own pressure but will require to be withdrawn by pumping or other artificially applied means.

Another important factor in the operation of such an oil well is the disposal of the salt water recovered with the oil. Several solutions have been tried but in every instance are open to conspicuous objections. The following are examples of such solutions which are directly affected by this invention.

When this refuse salt water can be impounded in storage pits, this practice is frequently followed. However, the maintenance of storage pits is subject to limitations both as to capacity and feasibility of locating them near the head of the well.

In many instances the salt water is allowed to drain into existing running streams but in this case there is a limit to what can be done without acting contrary to the public interest or infringing upon the rights of neighboring land owners.

Some attempts have been made at sub-surface disposal by piping the salt water to an agreed point of concentration remote from the producing part of the oil field. Here a large quantity of expensive equipment is involved for the limited period at which the disposal needs to be carried out. Also the capacity of the system must be equal to the total water production of the field. Again, there is the evident objection that such concentration and disposal may be against public interest and a trespass on the surface rights of the locality. Maintenance of such a system is of course a manner of considerable expense.

When such sub-surface disposal is carried out within the limits or area of the producing field it cannot be said to be feasible if the control of this field is shared by several or many independent operators. Such disposal in this manner is prejudicial to the individual operators and results in nonuniform or unbalancing effect upon the wells in production at the time the system is installed.

One of the objects of this invention is to provide means applicable to each individual producing well without interference with other wells of the same field and without excessive cost of equipment or maintenance.

A further object of the invention is to minimize the loss of pressure upon the oil body during its recovery.

One advantage of this invention also is the fact that the maximum quantity of oil will be recovered from the oil body surrounding the well.

A further object of the invention is the utilization of existing well equipment and the requirement for the simplest and minimum amount of additional equipment.

A further object of the invention is to effect the disposal of the waste salt water with a minimum expenditure of power and by utilizing the existing natural forces.

Further objects of the invention will be evident from the following description and claims.

For the purpose of illustrating one manner in which this invention may be carried out, I have shown on the accompanying drawing the preferred form of device. The drawing includes:

Fig. 1 is a vertical cross-section of a typical oil well arranged to carry out this invention;

Fig. 2 is a longitudinal section of the upper portion of the tool used in carrying out the invention, and Fig. 3 is a corresponding longitudinal cross-section of the lower portion of the same tool.

By way of illustrating the preferred form in which this invention may be practiced there has been shown in the accompanying drawing a schematic view of an oil well of general type.

This well is driven through the overlying formations 4, the oil bearing sand or deposit 5 and the lower formation 6. Typical of such formations the oil body has above it an impervious cap rock 7.

The well 8 is shown to have been extended through each formation with its bottom in the underlying or base formation. The formation is cored and a blank liner 9 is cemented with slow setting cement from a distance above the base of the lowermost sand section into the producing casing 10 of the well and to approximately 200 feet therein.

Any excess cement remaining in the hole is drilled out and the open hole cleaned as well as possible. After this the blank liner is perforated as shown at 11 in the oil producing zone by shooting.

Withdrawal of the oil is carried out through a shut-off device of the following description. A tube or piping 12 extends from a point above the productive horizon downwardly for a considerable distance as shown in Fig. 2. This tubing at its lower end has an open extension 13 (Fig. 3) attached by means of a coupling 14. Suitable hook-wall slips with guides 15 are mounted on the lower end of the tubing 12 in the usual manner and co-operate with the liner 9 and cone 16 for centering. The cone is mounted upon the tubing 12 as shown in Fig. 3.

To distinguish the tube 12 from the surrounding elements it will be called the return tube as it serves as means by which liquid is returned to the well and at a point below the perforations 11 through which the oil and salt water are withdrawn.

Surrounding an intermediate part of the return tube 12 is the lower packer 17 of oil proof rubber or the like adapted to fit tightly between the liner 9 and the return tube 12. Above lower packer 17 extends a loose spacer pipe 18 also perforated as indicated at 19 with holes opposite the perforations 11 in the liner 9.

Above the spacer pipe 18 there is a second or upper packer 20 also of oil proof rubber or the like and serving to close the space between the liner 9 and the tube 12.

The upper end of the tube 12 is held in head 21. This head and the tube 12 have registering lateral passageways 22 connecting the interior of the tube 12 with the space outside the head 21.

The head 21 also forms a coupling for a delivery pipe 23 which connects with suitable tubing, standing valve and the like at the top of the well where pumping equipment may be installed if necessary.

Within the return tube 12 there is carried a connecting pipe 24. The upper end of this connecting pipe is flared or swaged and then welded or otherwise permanently attached to the end of the return pipe 12 above the passageway 22. The lower end of the pipe has an elbow 25 which passes through the side wall of the tube 12 and forms an opening opposite the perforations 19 and 11.

At the top of the well an extension 26 of the delivery pipe passes into the separator 27. In the latter the discharge from the well is separated, the oil being carried on while the salt water is returned through pipe 28 to the top of the well. If conditions render it necessary a return pump 29 may be utilized to add pressure to the returning stream of salt water.

The so-called tool above described in detail may be conveniently and economically constructed. It may be inserted as a section of the usual tubing of a productive well.

When so utilized this device connects the interior of the well at the oil delivery level by means of the connecting pipe to the delivery tube through which the oil or mixed oil and salt water rises out of the well. When the pressure on the field is sufficient these mixed fluids rise without requiring any pumping.

The packers 17 and 20 confine the discharge of the liquids to the connecting pipe and prevent them from passing up within the liner.

The space between the casing or liner and the delivery pipe is utilized for the return of the salt water although a separate return pipe may be arranged if necessitated by conditions.

The salt water delivered at the top of the well will flow downward to the return pipe 12 by reason of the natural hydrostatic pressure of the water which will be more than the normal pressure on the field or oil body. This hydrostatic pressure, however, will be increased by optional use of the pump 29.

The salt water is delivered through the open extension 13 to the well beneath the point of withdrawal or of the oil body. This salt water will penetrate the sand of the base formation and rise against the oil body itself.

In this way the salt water returned to the well will compensate for that withdrawn with the oil. This reduces the loss of pressure upon the oil body to that which is attributable solely to the delivery of oil.

In its upward travel this salt water also flushes out the lower level of the oil body insuring the maximum delivery of oil to the point of withdrawal.

By this action the point of withdrawal remains the same until the oil body is entirely depleted, the oil being gradually caused to rise and approach the withdrawal level.

Since the salt water returned to the well is only that previously withdrawn from that immediate area whether it be the same well singly or in conjunction with an adjoining one, this practice will be free from objection or criticism on the part of nearby wells or the holders of surface rights in the land.

The above description of the invention and the apparatus by which it is carried out have been set forth merely by way of example. The invention includes such modifications in minor details of arrangement as will occur to one skilled in the art and within the scope of the appended claims.

What I claim is:

1. In oil well piping, a return pipe having an opening in its side, a connecting pipe having an end registering with said opening and its other end closing an end of the return pipe and a second opening through the side of the return pipe near its closed end.

2. In oil well piping, a return pipe having an opening in its side, a connecting pipe having an end registering with said opening and its other end closing an end of the return pipe, and a sleeve around said pipe end, said sleeve and pipe end both having registering openings.

3. In oil well piping, a return pipe having an opening in its side, a connecting pipe having an end registering with said opening and its other end closing an end of the return pipe, a spacer element outside the return pipe, packers on the pipe at opposite ends of said spacer, and a sleeve around said closed pipe end, said sleeve and pipe end both having registering openings.

4. Means for extracting oil from a well having the customary casing and perforated liner, comprising a return tube, an open extension at the lower end thereof, a perforated spacer tube surrounding the return tube, upper and lower packers between said tube and the liner, a head on the upper end of the return tube, said tube and head having a lateral passageway, a delivery pipe attached to the head and a connecting pipe within the return pipe and having one end opening into the delivery pipe and the other end opening through the return pipe.

WILLIAM E. SCHOENECK.